(12) United States Patent
Kim

(10) Patent No.: US 10,418,894 B2
(45) Date of Patent: Sep. 17, 2019

(54) INVERTER SYSTEM AND METHOD OF CONTROLLING THE SAME

(71) Applicant: LSIS CO., LTD., Anyang-si, Gyeonggi-do (KR)

(72) Inventor: Hyo Jin Kim, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 15/869,839

(22) Filed: Jan. 12, 2018

(65) Prior Publication Data

US 2018/0278143 A1    Sep. 27, 2018

(30) Foreign Application Priority Data

Mar. 21, 2017    (KR) .................. 10-2017-0035038

(51) Int. Cl.
| | |
|---|---|
| *H02M 1/15* | (2006.01) |
| *H02M 5/458* | (2006.01) |
| *H02P 3/22* | (2006.01) |
| *H02P 21/22* | (2016.01) |
| *H02P 27/06* | (2006.01) |
| *H02M 1/08* | (2006.01) |

(Continued)

(52) U.S. Cl.
CPC .............. *H02M 1/15* (2013.01); *H02M 5/458* (2013.01); *H02M 5/4585* (2013.01); *H02P 3/22* (2013.01); *H02P 21/22* (2016.02); *H02P 27/06* (2013.01); *H02M 1/08* (2013.01); *H02M 1/32* (2013.01); *H02M 2001/0058* (2013.01)

(58) Field of Classification Search
CPC ...... H02M 5/4585; H02M 1/15; H02M 5/458; H02M 2001/0054; H02P 21/22; H02P 27/06; H02P 3/22; H02P 21/24; H02P 8/16

See application file for complete search history.

(56) References Cited

U.S. PATENT DOCUMENTS 5,552,977 A * 9/1996 Xu ..................... H02M 7/53875
  318/811
6,653,812 B1* 11/2003 Huo .................. H02M 7/53875
  318/801

(Continued)

FOREIGN PATENT DOCUMENTS

| EP | 1444770 A1 | 8/2004 |
| EP | 1596491 A2 | 11/2005 |

(Continued)

OTHER PUBLICATIONS

Korean Office action for related Korean Application No. 10-2017-0035038; action dated Sep. 20, 2018; (4 pages).

(Continued)

*Primary Examiner* — Thai T Dinh
(74) *Attorney, Agent, or Firm* — K & L Gates LLP

(57) ABSTRACT

An inverter system includes a rectifier configured to convert a 3-phase AC voltage into a DC voltage, a DC link capacitor configured to smooth the DC voltage into a DC link voltage, an inverter unit configured to convert the DC link voltage into an AC voltage and to output the AC voltage to a motor, and a controller configured to control operation of the inverter unit. The controller performs control to switch the inverter unit to a zero vector when overload is applied during operation of the inverter unit.

4 Claims, 2 Drawing Sheets

(51) Int. Cl.
*H02M 1/32* (2007.01)
*H02M 1/00* (2006.01)

(56) References Cited

U.S. PATENT DOCUMENTS

| | | | |
|---|---|---|---|
| 9,318,976 B1* | 4/2016 | Wei | H02M 7/537 |
| 9,608,540 B2* | 3/2017 | Hirsch | H02M 1/32 |
| 2003/0002299 A1* | 1/2003 | Trzynadlowski | H02M 7/5395 363/21.1 |
| 2004/0207359 A1 | 10/2004 | Jahkonen | |
| 2005/0248361 A1* | 11/2005 | O'Gorman | H02P 3/22 324/765.01 |
| 2009/0069142 A1* | 3/2009 | Welchko | B60K 6/445 475/276 |
| 2014/0292238 A1* | 10/2014 | Furukawa | B60L 3/003 318/400.02 |
| 2015/0155795 A1* | 6/2015 | Hirsch | H02M 1/32 318/400.26 |
| 2015/0357934 A1* | 12/2015 | Hirsch | H02M 7/5395 318/400.02 |
| 2016/0094177 A1* | 3/2016 | Shimomugi | H02M 7/53875 318/400.2 |

FOREIGN PATENT DOCUMENTS

| | | |
|---|---|---|
| ES | 2355903 T3 | 4/2011 |
| JP | S62141997 A | 6/1987 |
| JP | H09201091 A | 7/1997 |
| JP | 3486037 B2 | 1/2004 |
| JP | 2006042529 A | 2/2006 |
| JP | 2009225561 A | 10/2009 |
| JP | 4862475 B2 | 1/2012 |
| JP | 2012165495 A | 8/2012 |
| JP | 5354369 B2 | 11/2013 |
| JP | 5637155 B2 | 12/2014 |
| KR | 101610068 B1 | 4/2016 |

OTHER PUBLICATIONS

Japanese Office Action for related Japanese Application No. 2018-030712; action dated Oct. 2, 2018; (3 pages).
European Search Report for related European Application No. 18153223.5; report dated Jun. 28, 2018; (8 pages).
Korean Office Action for related Korean Application No. 10-2017-0035038; action dated Mar. 14, 2018; (4 pages).
Japanese Office Action for related Japanese Application No. 2018-030712; action dated Jan. 22, 2019; (6 pages).

* cited by examiner

INVERTER SYSTEM AND METHOD OF CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2017-0035038 filed on Mar. 21, 2017, in the Korean Intellectual Property Office, the disclosure of which is hereby incorporated by reference in its entirety.

FIELD

The present invention relates to an inverter system and a method of controlling the same.

BACKGROUND

In general, an inverter is a power converter for converting commercial AC power into DC power, converting the DC power into AC power suitable for a motor and supplying the AC power to the motor. Such an inverter efficiently controls the motor, thereby reducing power consumption of the motor and increasing energy efficiency.

In a conventional inverter system, when overload is applied to the inverter to output overcurrent, a controller of the inverter may block the output gates of switching elements of the inverter.

At this time, the switching elements of the inverter are switched. As the number of turned-on switching element increases, switching loss generated upon switching increases.

In addition, when the switching elements are all turned off, ripple of the output current of the inverter increases.

SUMMARY

An object of the present invention is to provide an inverter system for reducing switching loss of switching elements included in an inverter unit and reducing ripple of output current upon applying overload to the inverter unit, and a method of controlling the same.

According to an aspect of the present invention, an inverter system includes a rectifier configured to convert a 3-phase AC voltage into a DC voltage, a DC link capacitor configured to smooth the DC voltage into a DC link voltage, an inverter unit configured to convert the DC link voltage into an AC voltage and to output the AC voltage to a motor, and a controller configured to control operation of the inverter unit. The controller performs control to switch the inverter unit to a zero vector when overload is applied during operation of the inverter unit.

The inverter unit may include three legs each including an upper switch and a lower switch connected to the upper switch in parallel, and the controller may select a zero vector according to a vector corresponding to the three legs and control the upper switches and the lower switches included in the three legs to switch to the zero vector state based on the zero vector, upon applying overload.

The zero vector may be a vector in which the number of times of switching the upper switches and the lower switches is smallest.

The controller may perform control to switch the upper switches and the lower switches from the zero vector state to a normal state, when the upper switches and the lower switches are in the zero vector state and overload is released.

The controller may perform control to select [1, 1, 1] as the zero vector and to switch to the zero vector state, in which only the upper switches included in the three legs are turned on, according to the zero vector, when the vector corresponding to the three legs is [0, 1, 1], [1, 0, 1] or [1, 1, 0].

The controller may select [0, 0, 0] as the zero vector and control switching to the zero vector state, in which the upper switches and the lower switches included in the three legs are turned off, according to the zero vector, when the vector corresponding to the three legs is [0, 0, 1], [0, 1, 0] or [1, 0, 0].

According to an aspect of the present invention, a method of controlling an inverter system includes selecting a zero vector according to a state of an inverter unit when overload is applied during operation of the inverter unit, switching the inverter unit to a zero vector state according to the zero vector, and switching the inverter unit from the zero vector state to a normal state when overload is released.

The inverter unit may include three legs each including an upper switch for converting an input DC link voltage into an AC voltage and outputting the AC voltage and a lower switch connected to the upper switch in parallel, and the selecting of the zero vector may include selecting a zero vector in which the number of times of switching of the upper switches and the lower switches is smallest.

The selecting of the zero vector may include selecting [1, 1, 1] as the zero vector, when a vector corresponding to the three legs is [0, 1, 1], [1, 0, 1] or [1, 1, 0].

The switching to the zero vector state may include switching to the zero vector state, in which only the upper switches included in the three legs are turned on, according to the zero vector.

The selecting of the zero vector may include selecting [0, 0, 0] as the zero vector, when a vector corresponding to the three legs is [0, 0, 1], [0, 1, 0] or [1, 0, 0].

The switching to the zero vector state may include switching to the zero vector state, in which the upper switches and the lower switches included in the three legs are turned on, according to the zero vector.

The method may further include maintaining the zero vector state when overload is not released.

DETAILED DESCRIPTION OF THE PREFERRED EMBODIMENT

Figure 1:
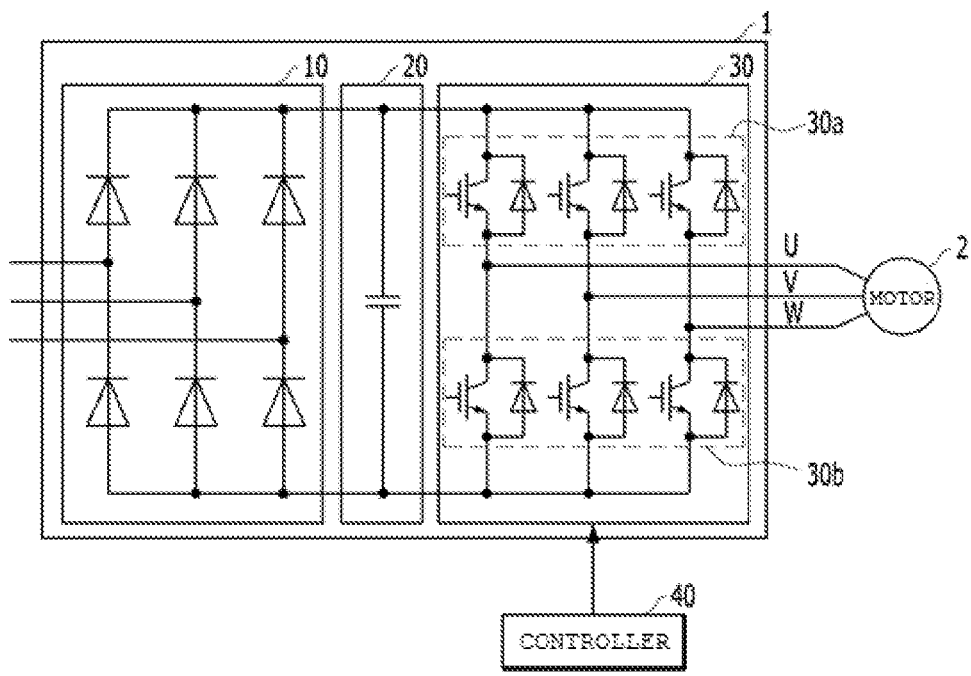
FIG. 1 is a schematic diagram of an inverter system according to the present invention.

The advantages and features of the present invention and the way of attaining the same will become apparent with reference to embodiments described below in detail in conjunction with the accompanying drawings. Embodiments, however, may be embodied in many different forms and should not be construed as being limited to exemplary embodiments set forth herein. Rather, these exemplary embodiments are provided so that this disclosure will be thorough and complete and will fully convey the scope to those skilled in the art. The scope of the present invention should be defined by the claims. Wherever possible, the same reference numbers will be used throughout the drawings to refer to the same or like parts. In the drawings, the sizes of layers and regions and the relative sizes thereof may be exaggerated for clarity of description.

It will be understood that, when an element is referred to as being "on" or "in contact with" another element, it can be directly "on" or "in contact with" the other element or be indirectly "on" or "in contact with" the other element with one or more intervening elements therebetween. In contrast, it will be understood that, when each element is referred to as being "directly on" or "directly in contact with" the other element, there is no intervening element therebetween. Other expressions describing a relationship between elements, such as "between" or "directly between" may be similarly interpreted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

A singular representation may include a plural representation unless the context clearly indicates otherwise. It will be understood that the terms 'comprising', 'including', etc., when used in this specification, specify the presence of several components or several steps and part of the components or steps may not be included or additional components or steps may further be included.

Unless obviously defined in the present invention, such terms are not interpreted as having ideal or excessively formal meanings.

Hereinafter, the preferred embodiment of the present invention will be described in detail with reference to the accompanying drawings.

FIG. 1 is a schematic diagram of an inverter system according to the present invention.

Referring to FIG. 1, the inverter 1 may include a rectifier 10, a DC link capacitor 20, an inverter unit 30 and a controller 40.

The rectifier 10 may convert an input 3-phase AC voltage into a DC voltage.

Although the rectifier 10 includes a plurality of diodes in the embodiment, a plurality of switching elements is applicable without being limited thereto.

The DC link capacitor 20 may output a DC link voltage obtained by smoothing the DC voltage rectified by the rectifier 10 to the inverter unit 30.

The inverter unit 30 may convert the DC link voltage output from the DC link capacitor 20 into an AC voltage having a predetermined level and frequency and output the AC voltage to a motor 2.

The inverter unit 30 includes three legs for outputting AC voltages and each leg may include an upper switch 30*a* and a lower switch 30*b* connected to the upper switch 30*b* in parallel.

That is, the three legs may output U-phase, V-phase and W-phase AC voltages to the motor 2, respectively.

The controller 40 may control the inverter unit 30 using a variable voltage variable frequency (VVVF) method or a vector control method.

In the embodiment, the controller 40 may control ON or OFF of the upper switches 30*a* and the lower switches 30*b* of the three legs included in the inverter unit 30 using a vector control method. In such a vector control method, the controller 40 may control the switching states of the upper switches 30*a* and the lower switches of the inverter unit 30 using a vector diagram of FIG. 2.

Figure 2:
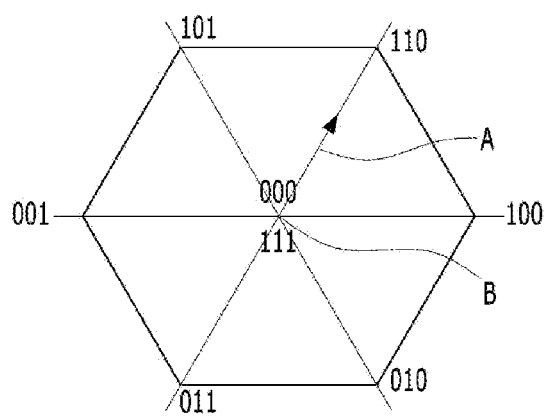
FIG. 2 is a diagram illustrating a vector control method of a controller shown in FIG. 1.

FIG. 2 is a diagram illustrating a vector control method of a controller shown in FIG. 1.

FIG. 2 is a vector diagram illustrating the vector control method of the controller 40.

Referring to FIG. 2, the controller 40 may output a control signal to maintain a vector corresponding to the three legs for outputting the U-phase, V-phase and W-phase AC voltages of the inverter unit 30 at [1, 1, 0], when a reference voltage shown in FIG. 2 is A and in a normal state.

That is, if a vector is [1, 1, 0], the controller 40 may output control signals for controlling the ON or OFF states of the upper switches 30*a* and the lower switches 30*b* included in the three legs to the upper switches 30*a* and the lower switches 30*b*.

Here, the controller 40 may perform control such that the upper switches 30*a* and the lower switches 30*b* included in two legs for outputting the U-phase and V-phase AC voltages corresponding to "1" among the three legs are respectively maintained in an ON state and an OFF state, when a vector is [1, 1, 0].

In addition, the controller 40 may perform control such that the upper switch 30*a* and the lower switch 30*b* included in one leg for outputting the W-phase AC voltage corresponding to "0" among the three legs are maintained in an OFF state.

When overload is applied while the inverter unit 30 operates in a normal state, the controller 40 may check the vector corresponding to the three legs in the vector diagram shown in FIG. 2 and select a zero vector in which the number of times of switching the upper switches 30*a* and the lower switches 30*b* included in the three legs is smallest.

The zero vector may refer to a vector for converting the switching states of the upper switches 30*a* and the lower switches 30*b* in the normal state into a zero vector state.

As described above, when overload is applied in a state in which the vector corresponding to the three legs is [1, 1, 0] in the normal state, [1, 1, 1] may be selected as the zero vector corresponding to the three legs.

Thereafter, the controller 40 may control switching to a zero vector state in which only the upper switches 30*a* included in the three legs are turned on, when the zero vector is [1, 1, 1]

Figure 3:
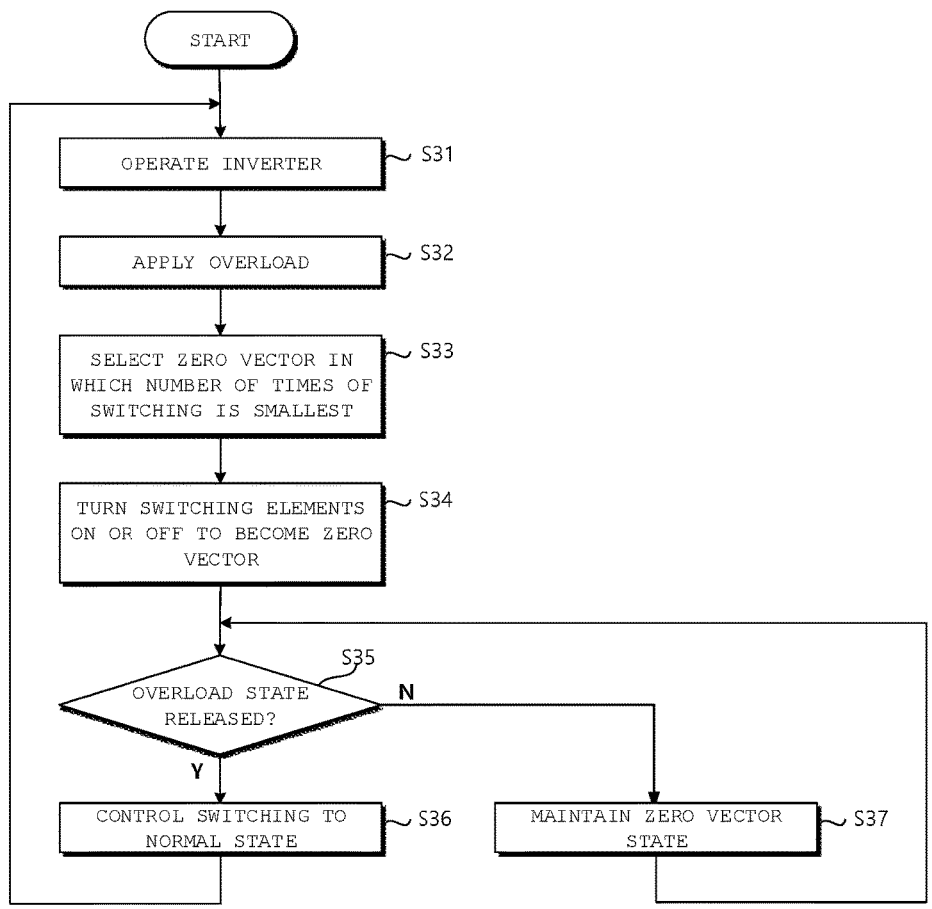
FIG. 3 is a flowchart illustrating a method of controlling an inverter system according to the present invention.

FIG. 3 is a flowchart illustrating a method of controlling an inverter system according to the present invention. In the inverter system of FIG. 1, the controller 40 controls the inverter unit 30.

Referring to FIG. 3, the controller 40 may output a control signal such that the inverter unit 30 operates according to the vector control method, for operation of the inverter 1 (S31).

Thereafter, the controller 40 may select the zero vector according to the state of the inverter unit (S33), when overload is applied to the inverter unit (S32).

That is, the controller 40 may select the zero vector according to the vector corresponding to the three-phase leg included in the inverter unit 30, when overload is applied to the inverter unit 30.

For example, the controller 40 may select [1, 1, 1] as the zero vector in which the number of times of switching the upper switches 30*a* and the lower switches 30*b* included in the three legs is smallest, when the vector corresponding to the three legs is [0, 1, 1], [1, 0, 1] or [1, 1, 0].

In addition, the controller 40 may select [0, 0, 0] as the zero vector in which the number of times of switching the upper switches 30*a* and the lower switches 30*b* included in the three legs is smallest, when the vector corresponding to the three legs is [0, 0, 1], [0, 1, 0] or [1, 0, 0].

In other words, for example, when V-phase current reaches overload operation current during switching operation of the switching elements of the inverter unit 30, the controller 40 checks the switching state of the switching element, determines [1, 1, 1] as the zero vector in which the number of times of switching the switches is smallest in the state of [0, 1, 0], and controls the switching states of the switching elements to become [1, 1, 1] corresponding to the zero vector.

As compared to a conventional method of switching all switching elements to an OFF state to become [0, 0, 0], switching loss may be reduced by 50%. If the overload state is maintained and then released, current ripple can be reduced by reduction of switching loss.

Here, the zero vectors [0, 0, 0] and [1, 1, 1] correspond to the origin B of FIG. 2. In this state, an output may not be equally generated.

The controller 40 may switch the switching states of the upper switches 30a and the lower switches 30b included in the three legs to the zero vector state according to the zero vector (S34).

That is, the controller 40 may control switching to the zero vector state in which only the upper switches 30a of the upper switches 30a and the lower switches 30b included in the three legs are turned on, when [1, 1, 1] is selected as the zero vector.

In other words, when [1, 1, 1] is selected as the zero vector, the controller 40 switches only the upper switches 30a included in the leg corresponding to "0" among the three legs from OFF to ON in the normal state to switch to the zero vector state, thereby reducing the number of times of switching to 1.

In addition, when [0, 0, 0] is selected as the zero vector, the controller 40 may control switching to the zero vector state in which the upper switches 30a and the lower switches 30b included in the three legs are all turned off.

In other words, when [0, 0, 0] is selected as the zero vector, the controller 40 switches only the upper switch 30a included in the leg corresponding to "1" among the three legs from ON to OFF to switch to the zero vector state, thereby reducing the number of times of switching to 1.

Thereafter, the controller 40 may determine whether overload is applied to the inverter unit 30 (S35) and control switching to the upper switches 30a and the lower switches 30b included in the three legs from the zero vector state to the normal state (S36) when overload is released.

As the result of determination of step S35, the controller 40 may perform control such that the zero vector state is maintained (S37) when overload applied to the inverter unit 30 is not released.

According to the control method according to the embodiment of the present invention, when overcurrent is output by the overload state of the inverter, a zero vector in which the number of times of switching the switches is smallest is selected and the switching elements of the inverter unit 30 are turned on or off through the zero vector, thereby reducing switching loss and reducing current ripple.

The above exemplary embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An inverter system comprising:
   a rectifier configured to convert a 3-phase AC voltage into a DC voltage;
   a DC link capacitor configured to smooth the DC voltage into a DC link voltage;
   an inverter unit configured to convert the DC link voltage into an AC voltage and to output the AC voltage to a motor, wherein the inverter unit includes three legs each including (i) an upper switch and (ii) a lower switch connected to the upper switch in parallel; and
   a controller configured to control operation of the inverter unit,
   wherein the controller switches the inverter unit to a zero vector when overload is applied during operation of the inverter unit,
   wherein the controller selects the zero vector according to a vector corresponding to the three legs and controls the upper switches and the lower switches included in the three legs to switch to a zero vector state based on the zero vector when overload is applied during operation of the inverter unit,
   wherein the controller selects the zero vector with the fewest changes to switching states of the upper switches and the lower switches,
   wherein the controller selects [1, 1, 1] as the zero vector when the vector corresponding to the three legs is [0, 1, 1], [1, 0, 1] or [1, 1, 0] and controls the upper switches and the lower switches included in the three legs to switch to the zero vector state in which only the upper switches included in the three legs are turned on, according to the zero vector, and
   wherein the controller selects [0, 0, 0] as the zero vector when the vector corresponding to the three legs is [0, 0, 1], [0, 1, 0] or [1, 0, 0] and controls the upper switches and the lower switches included in the three legs to switch to the zero vector state in which the upper switches and the lower switches included in the three legs are turned off, according to the zero vector.

2. The inverter system according to claim 1, wherein the controller controls the upper switches and the lower switches to switch from the zero vector state to a normal state, when the upper switches and the lower switches are in the zero vector state and the overload is released.

3. A method of controlling an inverter system, the method comprising:
   selecting a zero vector according to a state of an inverter unit when overload is applied during operation of the inverter unit;
   switching the inverter unit to a zero vector state according to the zero vector; and
   switching the inverter unit from the zero vector state to a normal state when the overload is released,
   wherein the inverter unit includes three legs each including (i) an upper switch for converting an input DC link voltage into an AC voltage and outputting the AC voltage and (ii) a lower switch connected to the upper switch in parallel, and
   wherein the selecting of the zero vector includes:
      selecting the zero vector with the fewest changes to switching states of the upper switches and the lower switches;
      selecting [1, 1, 1] as the zero vector when a vector corresponding to the three legs is [0, 1, 1], [1, 0, 1] or [1, 1, 0] and switching to the zero vector state in which only the upper switches included in the three legs are turned on, according to the zero vector; and
      selecting [0, 0, 0] as the zero vector when the vector corresponding to the three legs is [0, 0, 1], [0, 1, 0]

or [1, 0, 0] and switching to the zero vector state in which the upper switches and the lower switches included in the three legs are turned off, according to the zero vector.

4. The method according to claim 3, further comprising maintaining the zero vector state when the overload is not released.

* * * * *